United States Patent
Wang et al.

(10) Patent No.: US 9,817,454 B2
(45) Date of Patent: *Nov. 14, 2017

(54) APPARATUS AND METHOD FOR DYNAMIC THERMAL MANAGEMENT OF INTEGRATED CIRCUIT

(71) Applicant: MediaTek Inc., Hsin-Chu (TW)

(72) Inventors: Wei-Ting Wang, Taipei (TW); Yingshiuan Pan, Kaohsiung (TW); Kang-Chih Lin, Zhubei (TW)

(73) Assignee: MEDIATEK INC., Hsin-Chu (TW)

( * ) Notice: Subject to any disclaimer, the term of this patent is extended or adjusted under 35 U.S.C. 154(b) by 113 days.

This patent is subject to a terminal disclaimer.

(21) Appl. No.: 14/883,911

(22) Filed: Oct. 15, 2015

(65) Prior Publication Data

US 2017/0111988 A1     Apr. 20, 2017

(51) Int. Cl.
*H04M 1/00* (2006.01)
*G06F 1/20* (2006.01)
*G06F 1/32* (2006.01)
*G06F 9/46* (2006.01)

(52) U.S. Cl.
CPC .............. *G06F 1/206* (2013.01); *G06F 1/324* (2013.01); *G06F 1/3243* (2013.01); *G06F 1/3287* (2013.01); *G06F 9/46* (2013.01)

(58) Field of Classification Search
CPC ......... H04M 1/72569; H04M 1/72577; H04M 1/72525
See application file for complete search history.

(56) References Cited

U.S. PATENT DOCUMENTS

| 8,462,560 | B2 * | 6/2013 | Furutani | G11C 8/06 365/189.05 |
| 9,280,188 | B2 * | 3/2016 | Chen | G06F 1/206 |
| 9,521,246 | B2 * | 12/2016 | Hsu | H04M 1/72569 |
| 2006/0193157 | A1 * | 8/2006 | Ma | H02M 3/156 363/123 |
| 2006/0221527 | A1 * | 10/2006 | Jacobson | G01K 7/42 361/100 |
| 2007/0024292 | A1 * | 2/2007 | Greenberg | G01R 31/2875 324/721 |
| 2008/0114967 | A1 * | 5/2008 | Saen | G06F 1/3228 712/221 |

(Continued)

OTHER PUBLICATIONS

U.S. Appl. No. 14/294,170, filed Mar. 27, 2015, as well as prior art made of record in that application file.

(Continued)

*Primary Examiner* — Bobbak Safaipour
(74) *Attorney, Agent, or Firm* — McClure, Qualey & Rodack, LLP (57) ABSTRACT

A thermal control system for an integrated circuit in an electronic device includes a sensing unit, a calculating unit, and a control unit. The sensing unit is for providing a first temperature signal by sensing the temperature of the integrated circuit and providing a second temperature signal by sensing the temperature of a component of the electronic device. The calculating unit computes a target temperature value of the integrated circuit according to the second temperature signal. The control unit adjusts target setting for the integrated circuit according to the target temperature value and the first temperature signal.

22 Claims, 6 Drawing Sheets

(56) References Cited

U.S. PATENT DOCUMENTS

| | | | | |
|---|---|---|---|---|
| 2009/0290625 A1* | 11/2009 | Riddle | ............... | G06F 1/206 |
| | | | | 375/222 |
| 2013/0076381 A1* | 3/2013 | Takayanagi | ............ | G01K 3/005 |
| | | | | 324/750.03 |
| 2013/0139524 A1* | 6/2013 | Kim | ............... | F25B 21/02 |
| | | | | 62/3.7 |
| 2013/0205151 A1* | 8/2013 | Hsiao | ............... | 713/323 |
| 2014/0062513 A1* | 3/2014 | Johnson | ............ | G01R 31/2874 |
| | | | | 324/750.03 |
| 2015/0208557 A1* | 7/2015 | Porto | ............... | H05K 7/20945 |
| | | | | 307/117 |
| 2015/0350407 A1* | 12/2015 | Hsu | ............... | H04M 1/72569 |
| | | | | 455/418 |
| 2016/0003688 A1* | 1/2016 | Luber | ............... | G01K 15/007 |
| | | | | 361/103 |
| 2016/0092616 A1* | 3/2016 | Coutts | ............... | G06F 17/5009 |
| | | | | 703/2 |
| 2017/0026767 A1* | 1/2017 | Macours | ............... | G01K 7/427 |

OTHER PUBLICATIONS

U.S. Appl. No. 14/670,418, filed Jun. 3, 2014, as well as prior art made of record in that application file.

* cited by examiner

APPARATUS AND METHOD FOR DYNAMIC THERMAL MANAGEMENT OF INTEGRATED CIRCUIT

BACKGROUND OF THE INVENTION

Field of the Invention

The invention relates generally to a method and an apparatus for dynamic thermal management, and more particularly, to a method for controlling performance and temperature of integrated circuits within an electronic device, and an apparatus thereof.

Description of the Related Art

In general, when a surface temperature of a portable apparatus exceeds 40 degrees, the user of the portable apparatus is likely to suffer low-temperature burns. Thus, performance of the portable apparatus should be improved while maintaining the surface temperature of the portable apparatus below 40 degrees. For example, the operating frequency and voltage of the processors of the portable apparatus can be lowered to decrease the surface temperature of the mobile apparatus.

Figure 1:
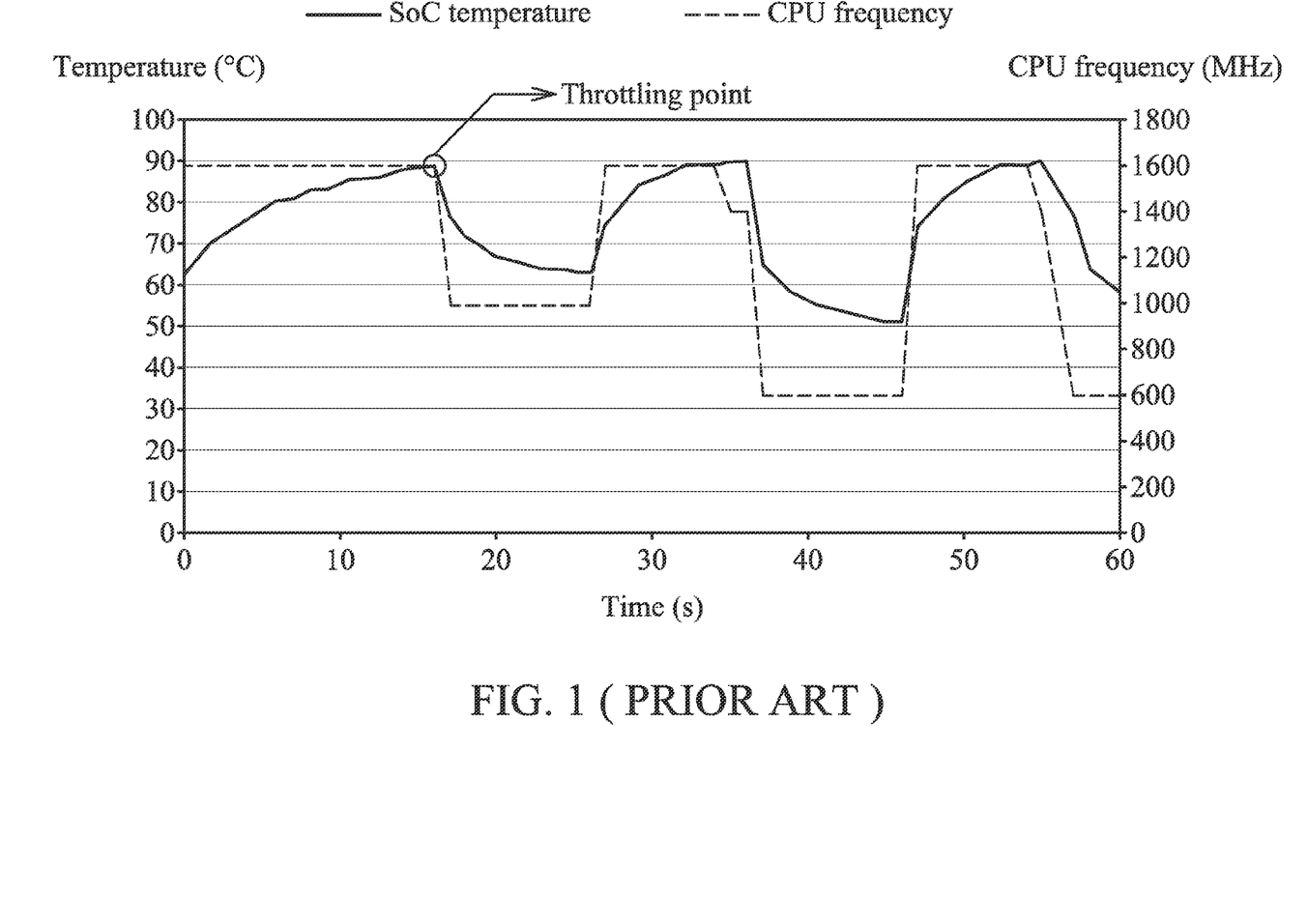
FIG. 1 is a timing diagram illustrating a conventional thermal control method for a mobile phone.

Please refer to FIG. 1, which illustrates a timing diagram of a conventional thermal control method for a mobile phone. As shown in FIG. 1, the conventional thermal control method detects a current temperature of a SoC of the cellphone, and when the temperature of the SoC attains 90° C. (i.e. a throttling point), the conventional thermal control method exhibits a phenomenon known as throttling (i.e. lowering the CPU frequency of the SoC). Thus, the throttling phenomenon quickly lowers the CPU frequency to reduce the temperature of the SoC, but the performance degradation may be huge.

BRIEF SUMMARY OF THE INVENTION

A thermal control system and a thermal control method are provided. An exemplary embodiment of the thermal control system for an integrated circuit in an electronic device comprises a sensing unit, a calculating unit, and a control unit. The sensing unit is for providing a first temperature signal by sensing the temperature of the integrated circuit and providing a second temperature signal by sensing the temperature of a component of the electronic device. The calculating unit computes a target temperature value of the integrated circuit according to the second temperature signal. And, the control unit adjusts target setting for the integrated circuit according to the target temperature value and the first temperature signal.

An exemplary embodiment of the thermal control method for an integrated circuit in an electronic device is provided. The thermal control method comprises steps that: sense the temperature of the integrated circuit to provide a first temperature signal; sense the temperature of a component of the electronic device to provide a second temperature signal; compute a target temperature value of the integrated circuit according to the second temperature signal; and adjust the target settings of the integrated circuit according to the target temperature value and the first temperature signal.

A detailed description is given in the following embodiments with reference to the accompanying drawings.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

Various embodiments of the invention are described with reference to the accompanying drawings in detail. The same reference numbers are used throughout the drawings to refer to the same or like components. These embodiments are made for the purpose of illustrating the general principles of the invention and should not be taken in a limiting sense. Detailed description of well-known functions and structures are omitted to avoid obscuring the subject matter of the invention.

The electronic device according to an embodiment of the invention may be implemented as a terminal with a multi-core, such as a Personal Digital Assistant (PDA), a smartphone, a tablet Personal Computer (PC), a Portable Multimedia Player (PMP), an electronic book terminal, a notebook PC, a netbook computer, or an Ultra Mobile Personal Computer (U MPC).

Figure 2:
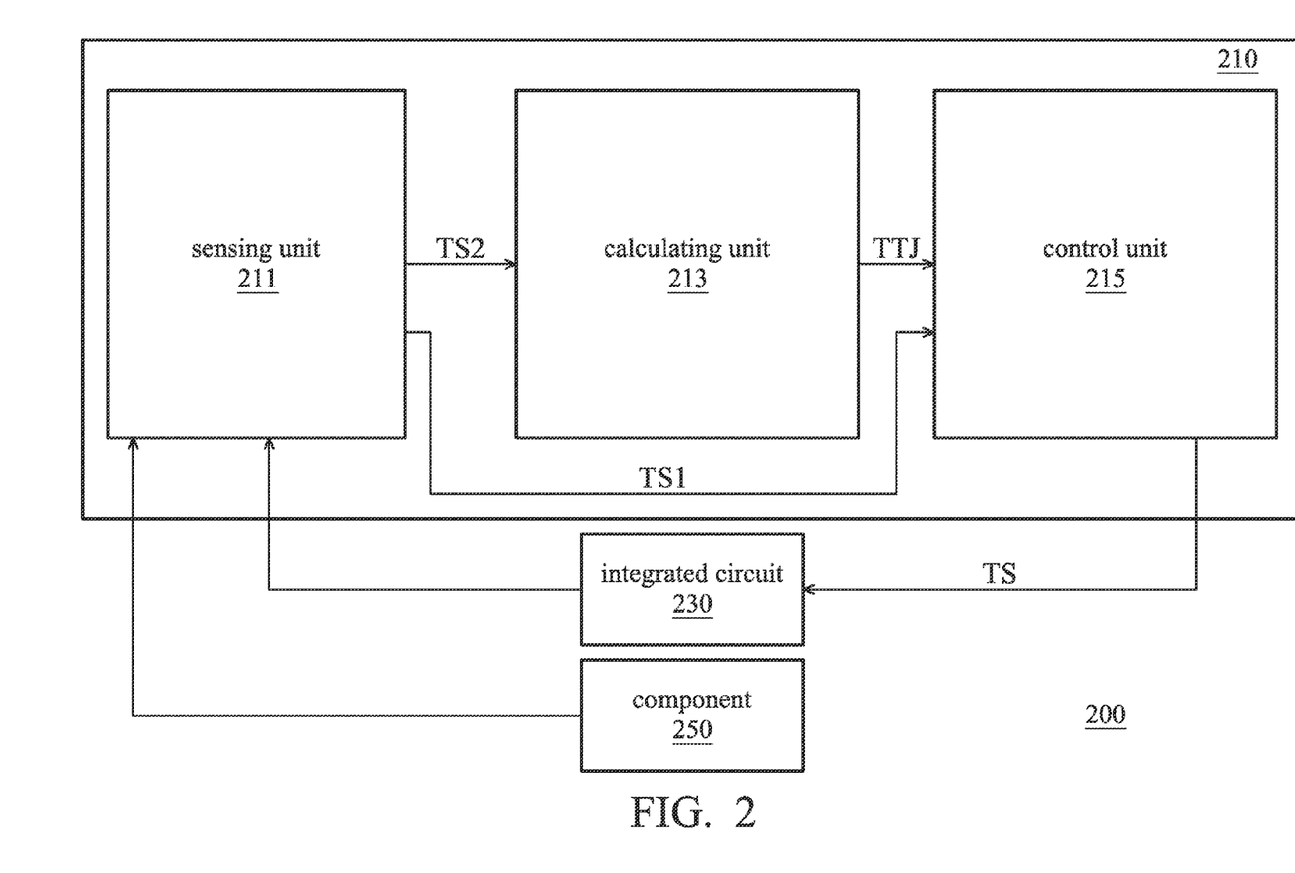
FIG. 2 is a simplified diagram of a thermal control system for an integrated circuit in an electronic device according to an embodiment of the invention.

FIG. 2 is a block diagram illustrating a thermal control system for an integrated circuit in an electronic device according to an embodiment of the invention. Referring to FIG. 2, the electronic device 200 according to an embodiment of the invention includes a thermal control system 210, an integrated circuit 230, and a component 250. The integrated circuit 230 may be a system on chip (SoC) while the component 250 is a printed circuit board (PCB). In one embodiment, the integrated circuit 230 is mounted or fabricated on the component 250 and both of them may be fully covered by a housing (not drawn) of the electronic device 200.

The thermal control system 210 comprises a sensing unit 211, a calculating unit 213 and a control unit 215. The sensing unit 211 is configured to provide a first temperature signal TS1 by sensing the temperature of the integrated circuit 230. The sensing unit 211 also provides a second temperature signal TS2 by sensing the temperature of the component 250. The calculating unit 213 is configured to compute a target temperature value TTJ of the integrated circuit 230 according to the second temperature signal TS2. The control unit 215 is configured to adjust a target setting TS for the integrated circuit 230 according to the target temperature value TTJ and the first temperature signal TS1.

Figure 3:
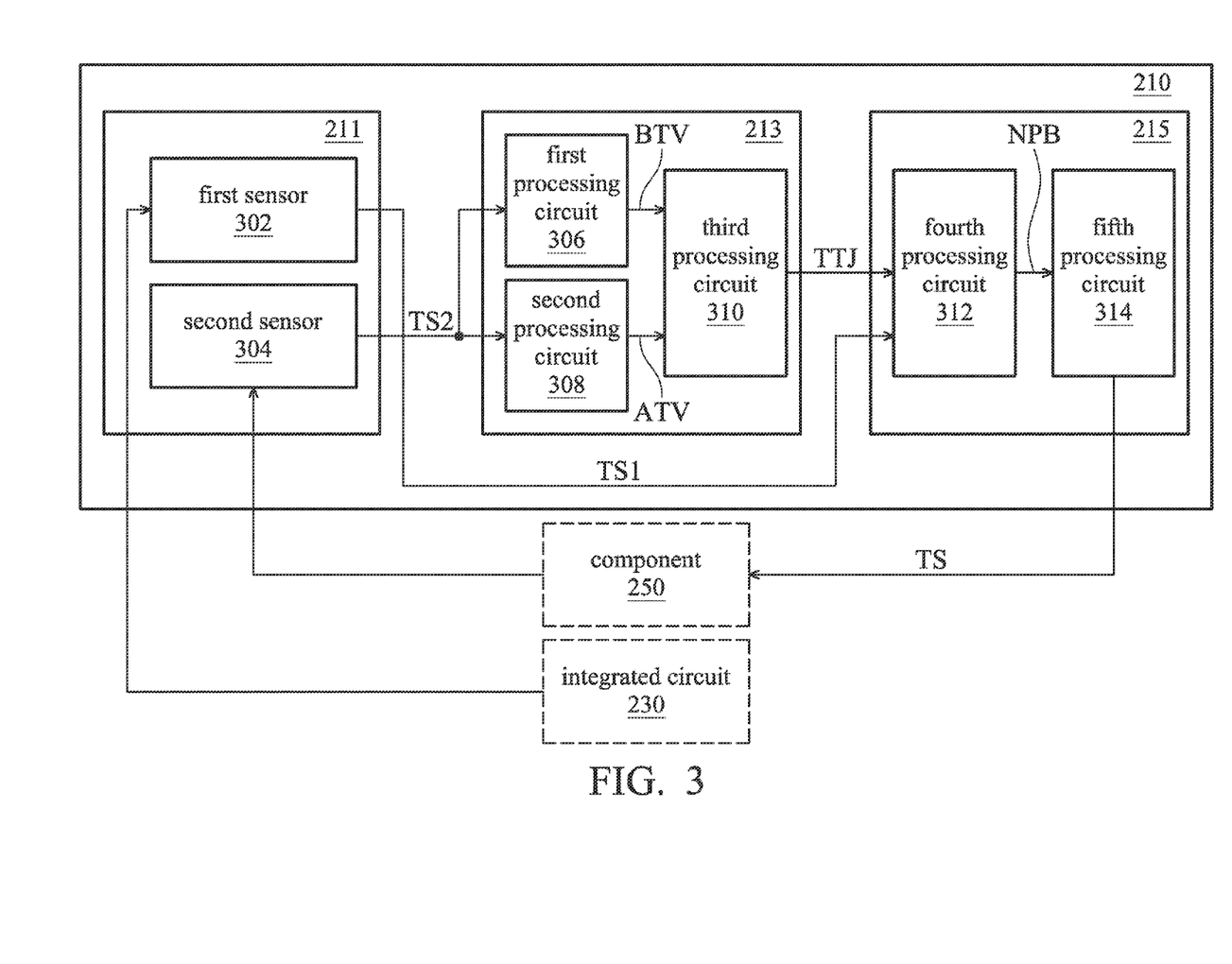
FIG. 3 illustrates the thermal control system of FIG. 2 in more detail according to another embodiment of the invention.

FIG. 3 illustrates the thermal control system 210 of FIG. 2 in more detail according to another embodiment of the invention. In FIG. 3, the sensing unit 211 comprises a first sensor 302 and a second sensor 304. The first sensor 302 may comprise one or more on-chip thermal sensors configured to provide the first temperature signal TS1 by sensing the temperature of the integrated circuit 230. The heat sensed by the first sensor 302 may come from heat sources including, but not limited to, processors such as the central processing unit (CPU), graphics processing unit (GPU), digital signal processor (DSP) or mobile computing unit (MCU), connectivity modules such as global positioning system (GPS), WiFi, Bluetooth, and modem, battery charging circuits, or dynamic random access memory (DRAM). The second sensor 304 is configured to provide the second temperature signal TS2 by sensing the temperature of the component 250. When the component 250 is a printed circuit board (PCB), the second sensor 304 may be one or more on-board thermal sensors. Note that in another embodiment, the second sensor 304 is not limited to "real" sensors. In other words, the second temperature signal TS2 provided by the second sensor 304 may be calculated from other thermal sensors. For example, the second temperature signal TS2 may be calculated by performing moving average on the first temperature signal so as to obtain more stable temperature values.

The calculating unit 213 comprises a first processing circuit 306, a second processing circuit 308, and a third processing circuit 310. The first processing circuit 306 receives the second temperature signal TS2 to calculate a base temperature value BTV accordingly. The second processing circuit 308 receives the second temperature signal TS2 to calculate an adjustment temperature value ATV accordingly. Then, the third processing circuit 310 calculates the target temperature value TTJ according to the base temperature value BTV and the adjustment temperature value ATV. In accordance with one embodiment of the invention, the third processing circuit 310 adds the base temperature value BTV and the adjustment temperature value ATV to obtain the target temperature value TTJ.

The control unit 215 comprises a fourth processing circuit 312 and a fifth processing circuit 314. The fourth processing circuit 312 generates a new power budget NPB of the integrated circuit 230 based on a current power budget (may be stored in the fourth processing circuit 312), the target temperature value TTJ of the integrated circuit 230 and a current value of the first temperature signal TS1. The fifth processing circuit 314 generates the target setting TS for the integrated circuit 230 according to the new power budget NPB.

Figure 4:
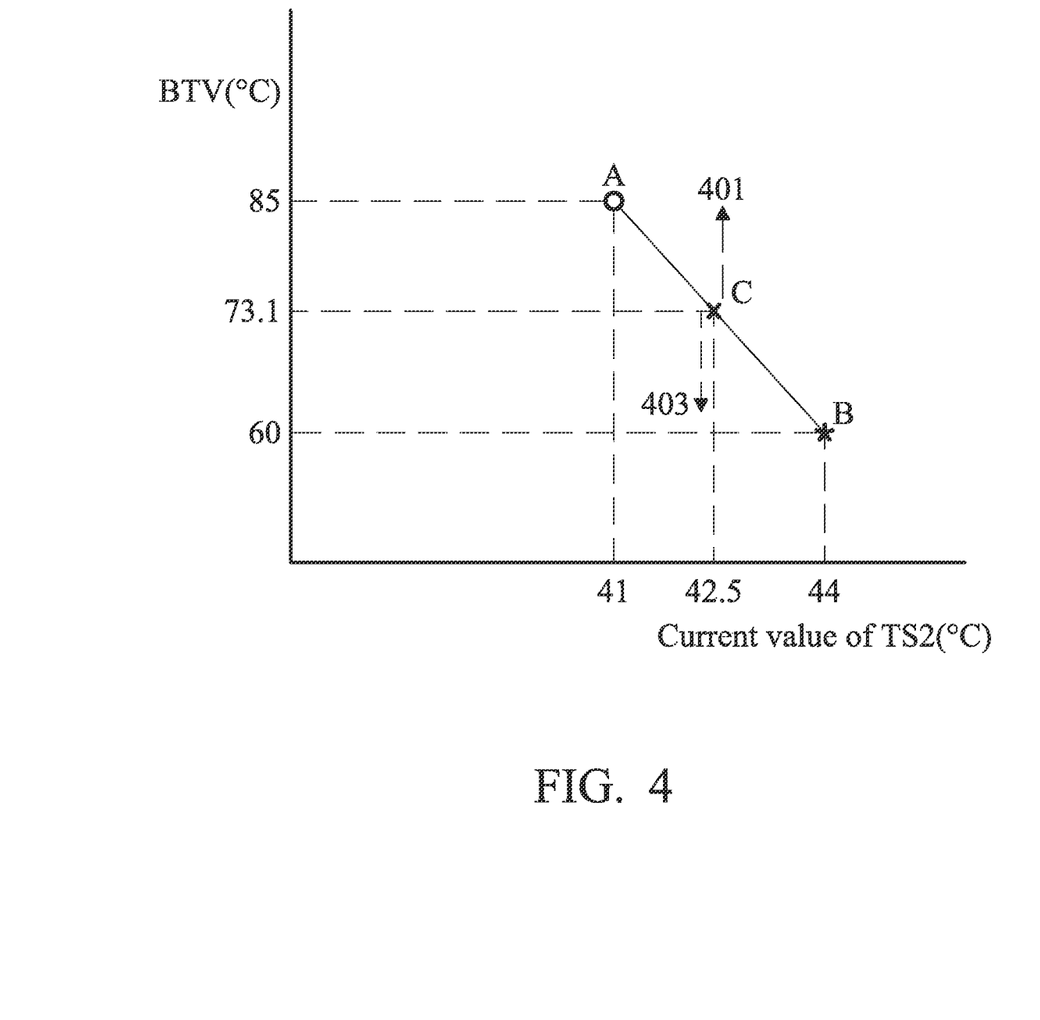
FIG. 4 shows how a target temperature value of the integrated circuit is calculated according to some embodiments of the invention.
Figure 5:
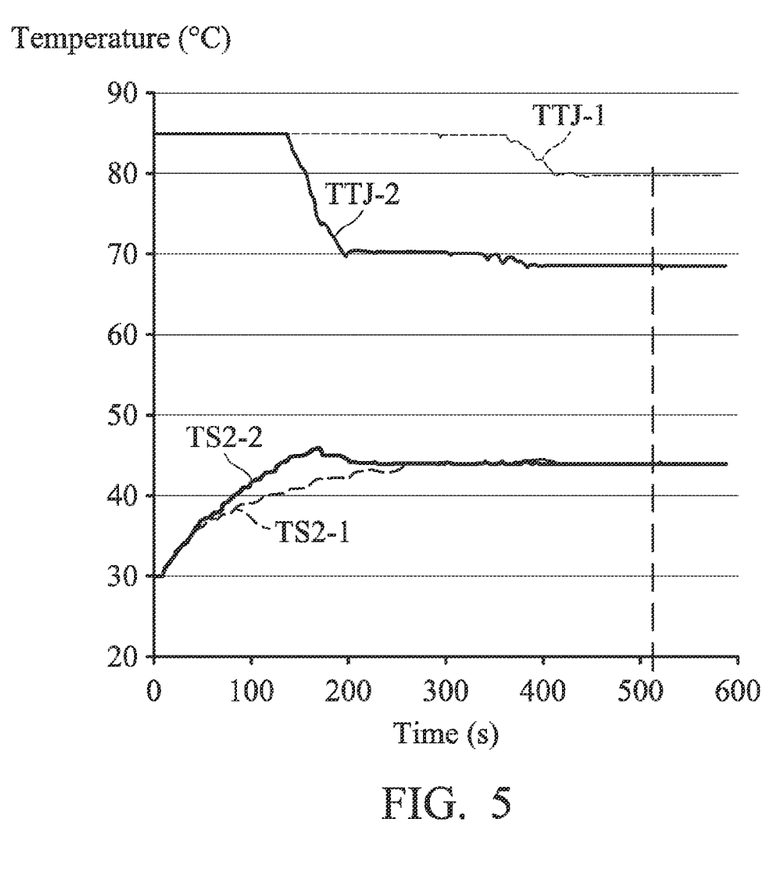
FIG. 5 shows how a target temperature value of the integrated circuit is calculated according to some embodiments of the invention.

FIGS. 4 and 5 show how the target temperature value TTJ of the integrated circuit 230 is calculated according to some embodiments of the invention. Please refer to FIG. 4 in light of FIG. 3. The first processing circuit 306 calculates the base temperature value BTV according to a current value of the second temperature signal TS2 and a mathematical function. The mathematical function is illustrated by the solid track (that crosses the point A, B and C) of FIG. 4, showing the mapping between the current value of the second temperature signal TS2 and the target temperature value TTJ. For example, when the current value of the second temperature signal TS2 is 44° C., the base temperature value BTV is 60° C. (point B) and when the current value of the second temperature signal TS2 is 41° C., the base temperature value BTV is 85° C. (point A). It can be observed that when the current value of the second temperature signal TS2 is within a range from 41° C. to 44° C., the mathematical function is a linear function that corresponds the current value of the second temperature signal TS2 to the base temperature value BTV.

When the current value of the second temperature signal TS2 is 42.5° C., the first processing circuit 306 would calculate the base temperature value BTV to be 73.1° C. (point C). In addition, the second processing circuit 308 would calculate the adjustment temperature value ATV according to past values of the second temperature signal TS2. The adjustment temperature value ATV serves to either increase or decrease the target temperature value TTJ from the base temperature value BTV. When the adjustment temperature value ATV is a positive value, the target temperature value TTJ provided by the third processing circuit 310 will be larger than 73.1° C. (depicted by the dash arrow 401). When the adjustment temperature value ATV is a negative value, the target temperature value TTJ provided by the third processing circuit 310 will be smaller than 73.1° C. (depicted by the dash arrow 403).

Please turn your attention to FIG. 3 and FIG. 5, which illustrate the effect of the adjustment temperature value ATV on the target temperature value TTJ. FIG. 5 illustrates two different scenarios: a first scenario shows the target temperature value TTJ-1 associated with the second temperature signal TS2-1 whereas a second scenario shows the target temperature value TTJ-2 associated with the second temperature signal TS2-2. During a steady state (e.g. at 500 seconds), the second temperature signal TS2-1 is quite close to the second temperature signal TS2-2; however, the target temperature value TTJ-1 (generated from TS2-1) is clearly lower than the target temperature value TTJ-2. This is because the adjustment temperature value ATV provided by the second processing circuit 308 is lower in the first scenario. In other words, even though the base temperature value BTV provided by the first processing circuit 306 in the two scenarios may be quite close (since the current value of TS2-1 and TS2-2 are close), the adjustment temperature value ATV calculated by the second processing circuit 308 is quite different such that the resulted target temperature value TTJ is quite distinct among the two scenarios. According to one embodiment of the invention, the second processing circuit 308 decreases the adjustment temperature value ATV as variation of the past values of the second temperature signal TS2 increases. For example, in the second scenario, the past values of the second temperature signal TS2-2 bear larger fluctuation especially around 150 seconds. As such, the associated adjustment temperature value ATV is lower so that the target temperature value TTJ obtained at 500 seconds is lower.

Referring to FIG. 2 as well, when the variation of the past values of the second temperature signal TS2 is larger (as illustrated by TS2-2), it implies that the skin temperature of the electronic device 200 has more chance to exceed an acceptable range because of the larger temperature variation of the component 250; henceforth, the target temperature value TTJ should be set lower (as illustrated by TTJ-2) to ensure the skin temperature of the electronic device 200 is within the acceptable range (e.g. <40° C.).

Some remarks have to be emphasized regarding FIGS. 2 through 4. Firstly, the mathematical function illustrated in FIG. 4 may be acquired based on experiment or experience. For instance, the current value of the second temperature signal TS2 for point B is 44° C.; and this value of 44° C. means that, during experiment, if the temperature of the component 250 falls below 44° C. in the long run, the skin temperature of the electronic device 200 is within the acceptable range. Conversely, if the temperature of the component 250 exceeds 44° C., the skin temperature of the electronic device 200 may be over the acceptable range and the user may suffer low temperature burns. As such, 44° C. may be referred to as an upper limit for the second temperature signal TS2. Likewise, the target temperature value TTJ for point B (60° C.) may be derived through experiment; and this value of 60° C. means that if the target temperature value TTJ of the integrated circuit 230 is fixed at 60° C. in the long run during experimentation, temperature of the component 250 will not exceed 44° C. Therefore, a strategy for thermal management of the electronic device 200 would be to set the target temperature value TTJ to a desired value, which in turn would result in the second temperature signal TS2 below the upper limit so that the skin temperature of the electronic device is within the acceptable range.

In another example, it can be found that the current value of the second temperature signal TS2 for point A is 41° C. The physical meaning of 41° C. is that when the current value of the second temperature signal TS2 does not exceed 41° C., there is no need to control the temperature of the integrated circuit 230. That is, it is not necessary to adjust the target temperature value TTJ of the integrated circuit 230 when the current value of the second temperature signal TS2 is below or equal to 41° C. This 41° C. boundary may be acquired according to experimental result. As for the target temperature value TTJ of point A (85° C.), this 85° C. is calculated by subtracting a positive value from a maximum allowable temperature of the integrated circuit 230. In one embodiment, the maximum allowable temperature of the integrated circuit 230 means that if the temperature of the integrated circuit 230 is over its maximum allowable temperature, then the integrated circuit 230 may fail or suffer permanent physical damage. Lowering the maximum allowable temperature (e.g. 100° C.) with the positive value (e.g. 15° C.), the target temperature value TTJ of the integrated circuit 230 is at most 85° C. so as to guarantee the safe operation of the circuitry.

Note that the temperature mapping among the second temperature signal TS2 of the component 250 and the target temperature TTJ of the integrated circuit 230 may be device dependent. That is, different electronic devices may exhibit different characteristics among the current value of the second temperature signal TS2 and the target temperature TTJ. For example, the particular temperature values of the point A and the point B may change from device to device (i.e. device-specific value). According to one embodiment of the invention, when the current value of the second temperature signal TS2 is within a device-specific range (e.g. 41° C. to 44° C.), the mathematical function is a linear function that corresponds the current value of the second temperature signal TS2 to the base temperature value BTV. In accordance with another embodiment of the invention, the device-specific range has a lower limit (41° C.) and the calculating unit 213 bypasses computing the target temperature value TTJ when the current value of the second temperature signal TS2 is smaller than the lower limit.

When the current value of the second temperature signal TS2 exceeds the upper limit (44° C.), the target temperature TTJ may need to be lowered as much as possible. For instance, the base temperature value BTV is set to a lower bound value (60° C.) by the first processing circuit 306 and the second processing circuit 308 calculates the adjustment temperature value ATV so that the third processing circuit 310 may obtain the target temperature value TTJ. In such a case, the adjustment temperature value ATV may be negative and the target temperature value TTJ may be even lower than the lower bound value 60° C. Thus, in one embodiment, the calculating unit 213 sets the base temperature value BTV to a lower bound value and calculates the adjustment value ATV for obtaining the target temperature value TTJ when the current value of the second temperature signal TS2 exceeds the upper limit.

Secondly, in addition to past values of the second temperature signal TS2, the second processing circuit 308 may calculate the adjustment temperature value ATV according to the current value of the second temperature signal TS2 and the upper limit (44° C.). For example, when the current value of the second temperature signal TS2 is 41.1° C., the adjustment temperature value ATV may be 3.1° C.; when the current value of the second temperature signal TS2 is 43° C., the adjustment temperature value ATV may be −9° C. This indicates that when the current value of the second temperature signal TS2 decreases (i.e. goes down away from the upper limit), the target temperature value TTJ is in effect increased as compared with the base temperature value BTV. When the current value of the second temperature signal TS2 approaches the upper limit, the target temperature value TTJ is in effect decreased as compared with the base temperature value BTV. Thus, according to one embodiment of the invention, the calculating unit 213 calculates the adjustment temperature value according to the current value of the second temperature signal TS2 and the upper limit.

Please refer back to FIG. 3. Once the target temperature value TTJ is provided by the calculating unit 213, the control unit 215 adjusts the target setting TS for the integrated circuit 230 according to the target temperature value TTJ and the first temperature signal TS1 (i.e. the current temperature of the integrated circuit 230). This may be performed in two steps. First, the fourth processing circuit 312 generates the new power budget NPB for the integrated circuit 230 based on a current power budget, the target temperature value TTJ and a current value of the first temperature signal TS1. For example, when the current value of the first temperature signal TS1 exceeds the target temperature value TTJ by 10° C., the fourth processing circuit 312 may decide that the new power budget NPB should be 1200 mW lower than the current power budget; when the current value of the first temperature signal TS1 exceeds the target temperature value TTJ by 20° C., the fourth processing circuit 312 may decide that the new power budget NPB should be 1800 mW lower than the current power budget. In other words, if the current power budget is 3600 mW, the new power budget NPB would be 2400 mW when the current temperature of the integrated circuit 230 exceeds the target temperature value TTJ by 10° C.; and the new power budget NPB would be 1800 mW when the current temperature of the integrated circuit 230 exceeds the target temperature value TTJ by 20° C.

An alternative method for generating the new power budget NPB further considers other information besides the current power budget, the target temperature value TTJ and the current value of the first temperature signal TS1. According to one embodiment, the sensing unit 211 provides the first temperature signal TS1 by sensing the temperature of a first specific region of the integrated circuit 230; and the sensing unit 211 is further configured, although not drawn in FIG. 3, to provide a third temperature signal by sensing (e.g. through a third sensor not shown) temperature of a second specific region of the integrated circuit 230. Then, the control unit 215 generates the new power budget NPB for the integrated circuit 230 further based on a current value of the third temperature signal (in addition to the current power budget, the target temperature value of the integrated circuit and the current value of the first temperature signal TS1). For example, the first specific region may be occupied by a central processing unit (CPU) of the integrated circuit 230 while the second specific region may be occupied by a graphic processing unit (GPU) of the integrated circuit. In other words, the current value of the first temperature signal TS1 quite reflects temperature of the CPU and the current value of the third temperature signal quite reflects temperature of the GPU. When the temperature of the CPU maintains quite the same, the new power budget NPB may be set lower as temperature of the GPU increases. For some cases where temperature tolerance for the CPU and the GPU might differ, the control unit 215 may set the new power budget to PX (e.g. 1000 mW) when the CPU is 60° C. and the GPU is 70° C., and set the new power budget to PY (e.g. 1200 mW) when the CPU is 70° C. and the GPU is 60° C. If PX is smaller than PY, it means the control unit 215 is "more willing" to allow the CPU to operate at higher temperature compared with the GPU.

In a second step, the fifth processing circuit 314 generates the target setting TS for the integrated circuit 230 according to the new power budget NPB. In one embodiment, the fifth processing circuit 314 may stores mapping between the new power budget NPB and the target setting TS. The target setting TS may suggest how many processor cores in the integrated circuit 230 should be turned on to operate at what operating frequencies. For instance, if the integrated circuit 230 having 8 processor cores, the new power budget NPB being 2400 mW would correspond to all 8 processor cores turned on under 1.5 GHz operating frequency while the new power budget NPB being 1800 mW would correspond to 4 processor cores turned on under 1.9 GHz operating frequency.

In one embodiment, the fifth processing circuit 314 applies the target setting TS on the integrated circuit 230 by iteration to perform an adjustment on settings (such as operating frequencies for processor cores) of the integrated circuit 213, wherein during each iteration a portion of the adjustment is performed. For instance, suppose the current power budget for the integrated circuit 203 is 3600 mW; under such power budget, 8 processor cores operate at 1.9 GHz. If now the new power budget NPB is determined to be 1800 mW, then the target setting TS would suggest 4 out of the 8 processor cores be turned off. Instead of switching 4 processor cores from on to off simultaneously, the fifth processing circuit 314 may apply the target setting TS to the integrated circuit 230 gradually: turn off 2 processor cores and wait for a period of time before turning off another 2 processor cores.

Moreover, the fourth processing circuit 312 may generate the new power budget NPB further according to a difference between the current value of the first temperature signal TS1 and the maximum allowable temperature (e.g. 100° C.) of the integrated circuit 230. For example, if the current temperature of the integrated circuit 230 is 90° C., the new power budget NPB may be lower compared with the situation that the current temperature of the integrated circuit 230 is 70° C. even though the differences between the current temperature of the integrated circuit 230 and the target temperature value TTJ are the same in both situations.

Compared with conventional thermal management scheme where settings on the integrated circuits may change abruptly, embodiments of the invention above provide more flexible and strategic ways for thermal management so as not to suffer performance too much while keeping temperature of the integrated circuit and electronic device within a proper range.

Figure 6:
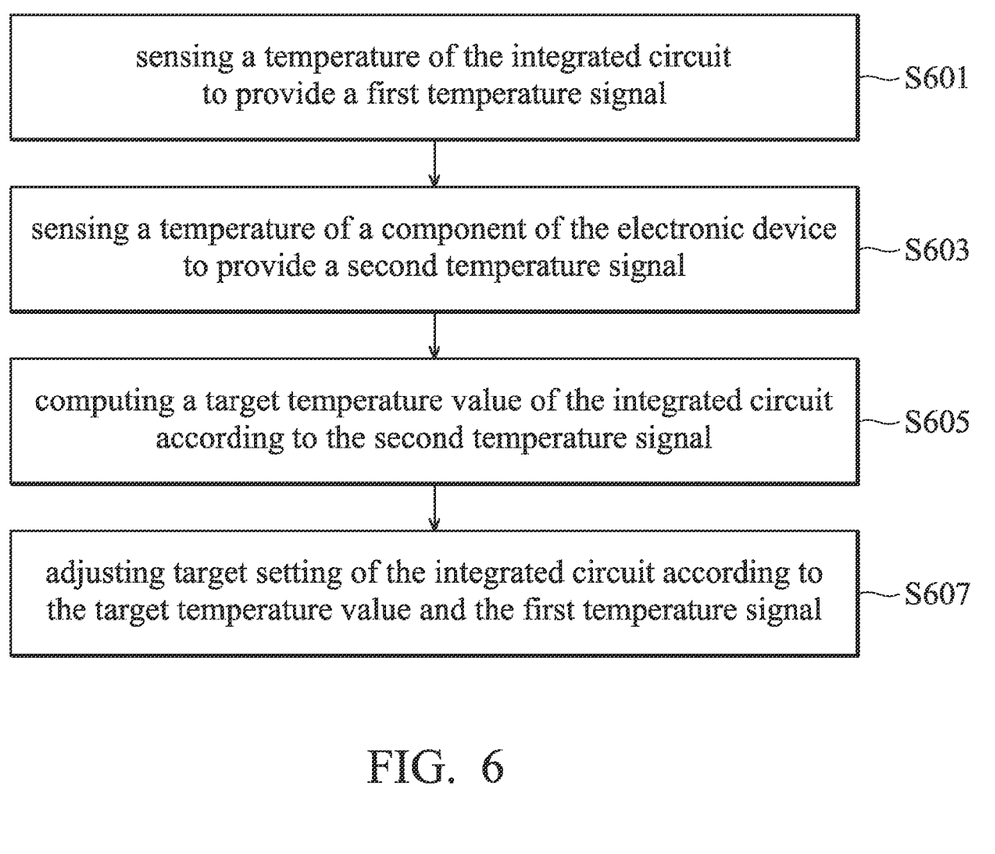
FIG. 6 is a flow chart illustrating a thermal control method for an integrated circuit in an electronic device according to still another embodiment of the invention.

FIG. 6 is a flow chart illustrating a thermal control method for an integrated circuit in an electronic device according to an embodiment of the invention. In step S601, a first temperature signal is provided by sensing the temperature of the integrated circuit. In step S603, a second temperature signal is provided by sensing the temperature of a component of the electronic device. Note that step S601 and step S603 may be performed at the same time. In step S605, a target temperature value of the integrated circuit is computed according to the second temperature signal. In step S607, a target setting of the integrated circuit is adjusted according to the target temperature value and the first temperature signal.

The method in FIG. 6 may be performed by hardware (e.g., circuitry, dedicated logic, programmable logic, microcode, application specific integrated circuits (ASICs), field-programmable gate arrays (FPGAs), etc.), software (e.g., instructions run on a processing device), or a combination thereof. In one embodiment, the method is performed by the thermal control system 210 in the electronic device 200 of FIG. 2. In another embodiment, the method is performed by the thermal control system 210 of FIG. 3.

The operations of the flow diagram of FIG. 6 have been described with reference to the exemplary embodiments of FIGS. 2 through 5. However, it should be understood that the operations of the flow diagrams of FIG. 6 can be performed by embodiments of the invention other than those discussed with reference to FIGS. 2 through 5, and the embodiments discussed with reference to FIGS. 2 through 5 can perform different operations than those discussed with reference to the flow diagrams. While the flow diagrams of FIG. 6 show a particular order of operations performed by certain embodiments of the invention, it should be understood that such order is exemplary (e.g., alternative embodiments may perform the operations in a different order, combine certain operations, overlap certain operations, etc.).

Various functional components or blocks have been described herein. As will be appreciated by persons skilled in the art, the functional blocks will preferably be implemented through thermal sensors and circuits (either dedicated circuits, or general purpose circuits, which operate under the control of one or more processors and coded instructions), which will typically comprise transistors that are configured in such a way as to control the operation of the circuitry in accordance with the functions and operations described herein. As will be further appreciated, the specific structure or interconnections of the transistors will typically be determined by a compiler, such as a register transfer language (RTL) compiler. RTL compilers operate upon scripts that closely resemble assembly language code, to compile the script into a form that is used for the layout or fabrication of the ultimate circuitry. Indeed, RTL is well known for its role and use in the facilitation of the design process of electronic and digital systems.

While the invention has been described by way of example and in terms of preferred embodiment, it is to be understood that the invention is not limited thereto. Those who are skilled in this technology can still make various alterations and modifications without departing from the scope and spirit of this invention. Therefore, the scope of the present invention shall be defined and protected by the following claims and their equivalents.

What is claimed is:

1. A thermal control system for an integrated circuit in an electronic device, the thermal control system comprising:
    a sensing circuit configured to provide a first temperature signal by sensing a temperature of the integrated circuit and a second temperature signal by sensing a temperature of a component within the electronic device;
    a calculating circuit configured to compute a target temperature value of the integrated circuit according to the second temperature signal; and a control circuit configured to adjust target setting for the integrated circuit according to the target temperature value and the first temperature signal.

2. The thermal control system of claim 1, wherein the calculating circuit computes the target temperature value by:
    calculating a base temperature value according to a current value of the second temperature signal and a mathematical function;
    calculating an adjustment temperature value according to past values of the second temperature signal; and
    adding the base temperature value and the adjustment temperature value to obtain the target temperature value.

3. The thermal control system of claim 2, wherein when the current value of the second temperature is within a device-specific range, the mathematical function is a linear function that corresponds the current value of the second temperature to the base temperature value.

4. The thermal control system of claim 3, wherein the device-specific range has a lower limit and the calculating circuit bypasses computing the target temperature value when the current value of the second temperature signal is smaller than the lower limit.

5. The thermal control system of claim 3, wherein the device-specific range has an upper limit and the calculating circuit calculates the adjustment temperature value further according to a current value of the second temperature signal and the upper limit.

6. The thermal control system of claim 5, wherein when the current value of the second temperature signal exceeds the upper limit, the calculating circuit sets the base temperature value to a lower bound value and calculates the adjustment temperature value for obtaining the target temperature value.

7. The thermal control system of claim 1, wherein the control circuit adjusts the target setting for the integrated circuit by:
    generating a new power budget of the integrated circuit based on a current power budget, the target temperature value of the integrated circuit and a current value of the first temperature signal; and
    generating the target setting for the integrated circuit according to the new power budget.

8. The thermal control system of claim 7, wherein the control circuit generates the new power budget further according to a difference between the current value of the first temperature signal and a maximum allowable temperature of the integrated circuit.

9. The thermal control system of claim 7, wherein the control circuit applies the target setting for the integrated circuit by iteration to perform an adjustment on settings of the integrated circuit, wherein during each iteration a portion of the adjustment is performed.

10. The thermal control system of claim 7, wherein the sensing circuit provides the first temperature signal by sensing a temperature of a first specific region of the integrated circuit and the sensing circuit is further configured to provide a third temperature signal by sensing a temperature of a second specific region of the integrated circuit, wherein the control circuit generates the new power budget of the integrated circuit further based on a current value of the third temperature signal.

11. The thermal control system of claim 1, wherein the component of the electronic device is a printed circuit board (PCB) and the integrated circuit is mounted on the printed circuit board.

12. A thermal control method for an integrated circuit in an electronic device, the thermal control method comprising:
    sensing a temperature of the integrated circuit to provide a first temperature signal;
    sensing a temperature of a component within the electronic device to provide a second temperature signal;
    computing a target temperature value of the integrated circuit according to the second temperature signal; and
    adjusting target setting of the integrated circuit according to the target temperature value and the first temperature signal.

13. The thermal control method of claim 12, wherein the target temperature value is computed by:
    calculating a base temperature value according to a current value of the second temperature signal and a mathematical function;
    calculating an adjustment temperature value according to past values of the second temperature signal; and
    adding the base temperature value and the adjustment temperature value to obtain the target temperature value.

14. The thermal control method of claim 13, wherein when the current value of the second temperature is within a device-specific range, the mathematical function is a linear function that corresponds the current value of the second temperature to the base temperature value.

15. The thermal control method of claim 14, wherein the device-specific range has a lower limit, the method further comprising:
    bypassing computing the target temperature value when the current value of the second temperature signal is smaller than the lower limit.

16. The thermal control method of claim 14, wherein the device-specific range has an upper limit and the adjustment temperature value is calculated further according to a current value of the second temperature signal and the upper limit.

17. The thermal control method of claim 16, wherein when the current value of the second temperature signal exceeds the upper limit, the base temperature value is set to a lower bound value and the adjustment temperature value is calculated for obtaining the target temperature value.

18. The thermal control method of claim 12, wherein the target setting of the integrated circuit is adjusted by:
    generating a new power budget of the integrated circuit based on a current power budget, the target temperature value of the integrated circuit and a current value of the first temperature signal; and
    generating the target setting for the integrated circuit according to the new power budget.

19. The thermal control method of claim 18, wherein the new power budget is generated further according to a difference between the current value of the first temperature signal and a maximum allowable temperature of the integrated circuit.

20. The thermal control method of claim 18, wherein the target setting is applied on the integrated circuit by iteration to perform an adjustment on settings of the integrated circuit, wherein during each iteration a portion of the adjustment is performed.

21. The thermal control method of claim 18, wherein the first temperature signal is provided by sensing a temperature of a first specific region of the integrated circuit and the method further comprising:
    providing a third temperature signal by sensing a temperature of a second specific region of the integrated circuit, wherein the new power budget of the integrated circuit is generated further based on a current value of the third temperature signal.

22. The thermal control method of claim 12, wherein the component of the electronic device is a printed circuit board (PCB) and the integrated circuit is mounted on the printed circuit board.

\* \* \* \* \*